United States Patent
Stalfors

(10) Patent No.: US 12,552,005 B2
(45) Date of Patent: Feb. 17, 2026

(54) POWER TOOL

(71) Applicant: HUSQVARNA AB, Huskvarna (SE)

(72) Inventor: Tobias Stalfors, Gothenburg (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/278,541

(22) PCT Filed: Feb. 25, 2022

(86) PCT No.: PCT/SE2022/050200
§ 371 (c)(1),
(2) Date: Aug. 23, 2023

(87) PCT Pub. No.: WO2022/182283
PCT Pub. Date: Sep. 1, 2022

(65) Prior Publication Data
US 2024/0058939 A1    Feb. 22, 2024

(30) Foreign Application Priority Data
Feb. 26, 2021 (SE) .................... 2150204-2

(51) Int. Cl.
*B25F 5/02* (2006.01)
*B27B 17/08* (2006.01)
(Continued)

(52) U.S. Cl.
CPC .................. *B25F 5/02* (2013.01); *G01K 7/16* (2013.01); *G01R 19/0084* (2013.01); *B27B 17/08* (2013.01)

(58) Field of Classification Search
CPC ......... B25F 5/02; G01K 7/16; G01R 19/0084; B27B 17/00–146; F02B 63/02
See application file for complete search history.

(56) References Cited

U.S. PATENT DOCUMENTS 4,543,723 A * 10/1985 Bortfeld ................ B27B 17/083
83/DIG. 1
5,005,295 A *  4/1991 Fushiya ................. B27G 19/04
83/DIG. 1
(Continued)

FOREIGN PATENT DOCUMENTS

DE        19536478 A1    4/1997
DE   112016003178 T5    4/2018
(Continued)

OTHER PUBLICATIONS

International Search Report and Written Opinion for International Application No. PCT/SE2022/050200 mailed Jun. 10, 2022.
(Continued)

*Primary Examiner* — Dariush Seif
(74) *Attorney, Agent, or Firm* — Burr & Forman

(57) ABSTRACT

A hand-held power tool (1) is disclosed comprising a tool (2) and a motor assembly (3). The power tool (1) further comprises an actuator (5), a light emitting device (7) arranged on or adjacent to the actuator (5), and a control arrangement (21). The control arrangement (21) is configured to enable or disable operation of the motor assembly (3) based on input from the actuator (5). The control arrangement (21) is configured to obtain fault data indicative of an at least potential operational fault of the power tool (1). The control arrangement (21) is further configured to cause the light emitting device (7) to output a first type of signal when no fault data is obtained, and to cause the light emitting device (7) to output a second type of signal, being distinguishable from the first type of signal, when fault data is obtained.

14 Claims, 2 Drawing Sheets

(51) Int. Cl.
*G01K 7/16* (2006.01)
*G01R 19/00* (2006.01)

(56) References Cited

U.S. PATENT DOCUMENTS

| | | | | |
|---|---|---|---|---|
| 6,232,672 | B1* | 5/2001 | Leufen | H02K 21/48 |
| | | | | 123/3 |
| 9,114,519 | B2* | 8/2015 | Iwata | B25B 23/1475 |
| 9,829,516 | B1* | 11/2017 | Ernst | G06F 1/28 |
| 10,495,048 | B2 | 12/2019 | Klatt et al. | |
| 10,749,356 | B2* | 8/2020 | Takeda | B25F 5/00 |
| 2008/0036429 | A1* | 2/2008 | Leufen | B27B 17/00 |
| | | | | 322/46 |
| 2013/0146040 | A1* | 6/2013 | Daeschner | F02P 3/055 |
| | | | | 123/625 |
| 2014/0005001 | A1* | 1/2014 | Karrar | F02P 11/025 |
| | | | | 477/204 |
| 2014/0054054 | A1* | 2/2014 | Osborne | B25F 5/00 |
| | | | | 173/217 |
| 2015/0198129 | A1* | 7/2015 | Dangelmaier | F02B 63/02 |
| | | | | 701/113 |
| 2016/0021819 | A1* | 1/2016 | Nakano | B25F 5/02 |
| | | | | 30/276 |
| 2016/0099575 | A1* | 4/2016 | Velderman | H02J 7/342 |
| | | | | 320/113 |
| 2016/0359343 | A1* | 12/2016 | Ito | B25F 5/00 |
| 2018/0205244 | A1* | 7/2018 | Ichikawa | H02J 7/0032 |
| 2018/0337553 | A1* | 11/2018 | Wang | H02J 9/061 |
| 2019/0070654 | A1* | 3/2019 | Ross | B21D 31/04 |
| 2019/0072632 | A1* | 3/2019 | Huber | G01R 35/00 |
| 2019/0084144 | A1* | 3/2019 | Nieh | G01L 5/22 |
| 2019/0085779 | A1* | 3/2019 | Klatt | F02B 63/02 |
| 2019/0085812 | A1* | 3/2019 | Klatt | F02D 41/22 |
| 2019/0344420 | A1* | 11/2019 | Kawamura | F02M 15/04 |
| 2021/0109134 | A1* | 4/2021 | Suzuki | G01R 31/327 |
| 2021/0170501 | A1* | 6/2021 | Barezzani | E01B 31/06 |
| 2021/0220959 | A1* | 7/2021 | Matsubara | B24B 23/02 |
| 2024/0190032 | A1* | 6/2024 | Otto | B27B 17/025 |
| 2025/0018548 | A1* | 1/2025 | Liu | H02K 7/145 |

FOREIGN PATENT DOCUMENTS

| | | |
|---|---|---|
| EP | 2814641 B1 | 9/2019 |
| JP | 2002210678 A | 7/2002 |
| JP | 3907950 B2 | 4/2007 |
| JP | 2011255483 A | 12/2011 |
| RU | 2520246 C2 | 6/2014 |
| WO | 2019031273 A1 | 2/2019 |

OTHER PUBLICATIONS

Search Report and Office Action for Swedish Application No. 2150204-2 mailed Nov. 8, 2021.

* cited by examiner

POWER TOOL

TECHNICAL FIELD

The present disclosure relates to a hand-held power tool comprising a tool and a motor assembly configured to power the tool.

BACKGROUND

Today, there are many kinds of power tools available on the market. Examples are chain saws, circular saws, trimmers, hedge trimmers, lawn mowers, leaf blowers, multi-tools, snow blowers, and the like. Power tools are for example used in industry, in construction, in gardens, for housework tasks, and around houses for purposes of driving fasteners, drilling, cutting, shaping, sanding, grinding, routing, polishing, painting, heating, and the like.

A common feature of power tools is that they comprise a tool which can be driven by a power source other than solely manual labour. The power source may for example comprise an electric motor, a pneumatic motor, a combustion engine, or the like.

Modern power tools can be provided with different features and functions which can facilitate the use of the power tool and/or can improve the final result of a use session of the power tool. However, many of these features and functions add cost and complexity to the power tool. As an example, the addition of one or more features and functions usually require the addition of several electrical components and electrical connections, such as electrical cables.

There are several more problems that may be addressed when designing a power tool, such as reliability. That is, power tools usually operate in a demanding environment with a lot of dust, debris, water, vibrations, and the like. Therefore, when designing a power tool, it is preferably ensured that it is durable and reliable. The addition of one or more features and functions may impair the durability and reliability of a power tool. A further problem that may be addressed is user-friendliness. For example, it is an advantage if the power tool is designed such that a user can operate the power tool in an intuitive manner.

Furthermore, generally, on today's consumer market, it is an advantage if products, such as power tools, have conditions and/or characteristics suitable for being manufactured and assembled in a cost-efficient manner.

The document US2019085812A1 discloses a handheld work apparatus having a combustion engine and an ignition device for controlling a spark plug. The ignition device includes an electronic control device having a short circuit button for switching off the combustion engine. A temperature sensor is provided for capturing an operating temperature. The short circuit button and the temperature sensor are connected to a common signal input of the control device via a common signal line. The temperature sensor is an ohmic resistance variable on the basis of the temperature. A measurement voltage dropped across the resistance of the temperature sensor is supplied, as an analog temperature signal, to a common analog signal input of the control device. The measurement voltage at the temperature sensor collapses in the button position of the short circuit button, as a result of which the analog temperature signal applied to the analog signal input of the control device is extinguished.

SUMMARY

It is an object of the present invention to overcome, or at least alleviate, at least some of the above-mentioned problems and drawbacks.

According to an aspect of the invention, the object is achieved by a hand-held power tool comprising a tool and a motor assembly configured to power the tool. The power tool further comprises an actuator, a light emitting device arranged on or adjacent to the actuator, and a control arrangement operably connected to the actuator, to the motor assembly and to the light emitting device. The control arrangement is configured to switch between a first and a second state based on input from the actuator, wherein the control arrangement is configured to enable operation of the motor assembly when in the first state and is configured disable operation of the motor assembly when in the second state. The control arrangement is configured to obtain fault data indicative of an at least potential operational fault of the power tool and is configured to cause the light emitting device to output a first type of signal when no fault data is obtained, and to cause the light emitting device to output a second type of signal, being distinguishable from the first type of signal, when fault data is obtained.

Since the control arrangement is configured to cause the light emitting device to output the first or second type of signal based on the fault data, a power tool is provided capable of indicating the presence of an at least potential operational fault of the power tool to a user in a simple and efficient manner. Moreover, due to these features, a cost-efficient solution is provided because only one light emitting device is needed for indicating the presence of an at least potential operational fault of the power tool to a user of the power tool. By using only one light emitting device, or a low number of light emitting devices, the need for additional cables is kept low.

Accordingly, a power tool is provided having conditions and characteristics suitable for being manufactured and assembled in a cost-efficient manner while being capable of informing a user of the power tool about the presence of an at least potential operational fault of the power tool. As a further result thereof, damage of components of the power tool caused by improper operation of the power tool, and/or operation of the power tool during presence of an at least potential operational fault of the power tool, can be avoided.

In addition, since the light emitting device is arranged on or adjacent to the actuator, a power tool is provided having conditions for being used in an intuitive manner because the first and second signals are emitted from a position of the power tool at which the user interacts upon activation and/or deactivation of the power tool.

Accordingly, a power tool is provided overcoming, or at least alleviating, at least some of the above-mentioned problems and drawbacks. As a result, the above-mentioned object is achieved.

Optionally, the control arrangement is configured to cause the light emitting device to output the first type of signal or the second type of signal when the control arrangement is in the first state. Thereby, a power tool is provided in which a user is informed about the presence of an at least potential operational fault of the power tool in a simple, intuitive, and cost-efficient manner when the power tool is activated. Accordingly, as an example, when a user of the power tool transfers the control arrangement from the second state to the first state using the actuator, a user may obtain information about the presence of an at least potential operational fault of the power tool by looking at the light emitting device.

Optionally, the control arrangement is configured to cause the light emitting device to output the first type of signal or the second type of signal only when the control arrangement is in the first state. Thereby, an energy efficient solution is provided for informing a user about the presence of an at least potential operational fault of the power tool. This because the control arrangement is configured to cause the light emitting device to output the first type of signal or the second type of signal only when the control arrangement is in the first state, i.e. in the state in which the control arrangement enables operation of the motor assembly. As a further result thereof, the need for electric energy for powering the control arrangement and the light emitting device is reduced. Furthermore, the need for one or more batteries supplying electricity to the control arrangement and the light emitting device is circumvented, or at least reduced.

Optionally, the control arrangement is configured to render the light emitting device inoperable when the control arrangement is in the second state. Thereby, an energy efficient solution is provided for informing a user about the presence of an at least potential operational fault of the power tool. This because the control arrangement is configured to render the light emitting device inoperable when the control arrangement is in the second state, i.e. in the state in which the control arrangement disables operation of the motor assembly. As a further result thereof, the need for electric energy used by the control arrangement and the light emitting device is reduced. Furthermore, the need for one or more batteries supplying electricity to the control arrangement and the light emitting device is circumvented, or at least reduced.

Optionally, one of the first and second types of signals involves a blinking light signal and the other of the first and second types of signals involves a continuous light signal. Thereby, a simple and cost-effective solution is provided requiring only one light emitting device for informing a user about the presence of an at least potential operational fault of the power tool. Moreover, since one of the first and second types of signals involves a blinking light signal and the other of the first and second types of signals involves a continuous light signal, a user can distinguish between the first and second signals in a simple, clear, and intuitive manner.

Optionally, the actuator is movable between a first and a second position, and wherein the control arrangement is configured to assume the first state when the actuator is in the first position and is configured to assume the second state when the actuator is in the second position. Thereby, a simple and efficient solution is provided for allowing a user to activate and deactivate the power tool in an intuitive manner. Moreover, the user can obtain tactile input regarding the activation state of the power tool.

Optionally, the power tool comprises an electric circuit operably connecting the actuator and the light emitting device to the control arrangement, and wherein the control arrangement is configured to receive input from the actuator by monitoring the voltage in the electric circuit. Thereby, a simple and cost-efficient power tool is provided allowing a user to activate and deactivate the power tool using the actuator and allowing a user to be informed about the presence of an at least potential operational fault of the power tool by monitoring the light emitting device.

Optionally, the power tool further comprises a temperature sensor arranged in the electric circuit. Thereby, a power tool is obtained having conditions for obtaining a current temperature in a simple and cost effective manner. The current temperature may be utilized to control operation of the motor assembly of the power tool and/or other parts or arrangements of the power tool.

Optionally, the actuator is configured to break the electric circuit upon actuation. Thereby, a simple and cost-efficient power tool is provided allowing a user to activate and deactivate the power tool using the actuator.

Optionally, the electric circuit comprises a first branch and a second branch arranged in parallel to the first branch, wherein the light emitting device is arranged in the second branch, and wherein the actuator is configured to break the first branch upon actuation. Thereby, a power tool is provided in which the control arrangement can cause the light emitting device to output a signal regardless of a current state or position of the actuator.

Optionally, the temperature sensor is arranged in the first branch of the electric circuit. Thereby, a cost-efficient solution is provided for obtaining a current temperature because the temperature sensor is arranged in the same branch as the actuator which circumvents the need for a separate branch for the temperature sensor.

Optionally, the temperature sensor is arranged in the actuator. Thereby, a cost-efficient solution and a space-efficient solution is provided for obtaining a current ambient temperature. Moreover, a current ambient temperature can be sensed without having to add further cables to the arrangement. The current ambient temperature may be utilized to control operation of the motor assembly of the power tool and/or other parts or arrangements of the power tool.

Optionally, the actuator comprises a switch. Thereby, a cost efficient, simple, and reliable solution is provided for allowing a user to activate and deactivate the power tool using the actuator Optionally, the control arrangement comprises a microprocessor. Thereby, a power tool is provided having conditions for more advanced control functions. As an example, a power tool is provided in which the control arrangement has conditions for causing the light emitting device to output the first or second signals regardless of a current state or position of the actuator.

Optionally, the microprocessor is arranged in the actuator. Thereby, a cost-efficient solution and a space-efficient solution is provided having conditions for causing the light emitting device to output the first or second signals regardless of a current state or position of the actuator. Moreover, the need for further cables is kept low.

Optionally, the light emitting device is a light emitting diode. Thereby, a simple, cost-effective, reliable and energy efficient light emitting device is provided capable of informing a user about the presence of an at least potential operational fault of the power tool.

Optionally, the motor assembly comprises an internal combustion engine. Thereby, a power tool is capable of informing a user of the power tool about the presence of an at least potential operational fault of the combustion engine while having conditions and characteristics suitable for being manufactured and assembled in a cost-efficient manner. As a further result thereof, damage of components of the power tool caused by improper operation of the power tool or the combustion engine, and/or operation of the power tool during presence of an at least potential operational fault of the power tool or the combustion engine, can be avoided.

Optionally, the power tool is a chainsaw. Since the control arrangement is configured to cause the light emitting device to output the first or second type of signal based on the fault data, a chainsaw is provided capable of indicating the presence of an at least potential operational fault of the chainsaw to a user in a simple and efficient manner. Moreover, due to these features, a cost-efficient solution is provided because only one light emitting device is needed for indicating the presence of an at least potential operational fault of the chainsaw to a user. In other words, a chainsaw is provided having conditions and characteristics suitable for being manufactured and assembled in a cost-efficient manner while being capable of informing a user of the chainsaw about the presence of an at least potential operational fault of the chainsaw. As a further result thereof, damage of components of the chainsaw caused by improper operation of the chainsaw and/or operation of the chainsaw during presence of an at least potential operational fault, can be avoided.

In addition, since the light emitting device is arranged on or adjacent to the actuator, a chainsaw is provided having conditions for being used in an intuitive manner because the first and second signals are emitted from a position of the chainsaw at which the user interacts upon activation and/or deactivation of the chainsaw.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
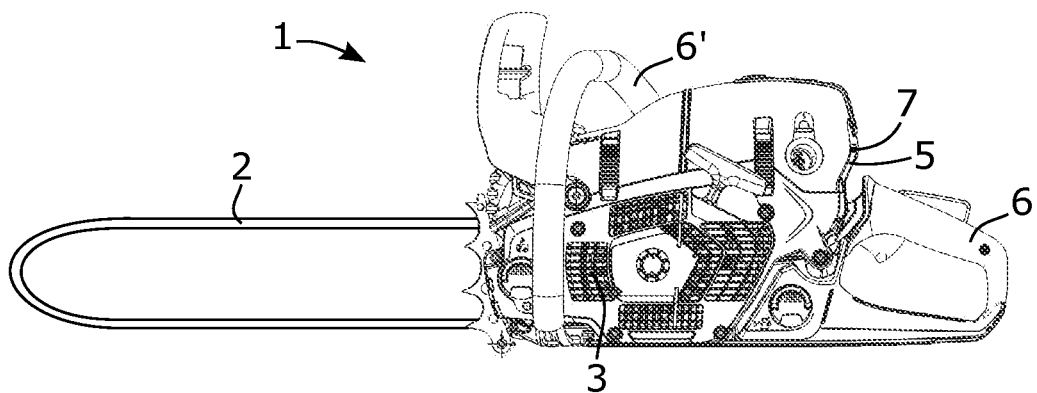
FIG. 1 illustrates a hand-held power tool according to some embodiments of the present disclosure, FIG. 2 schematically illustrates a power/control assembly of the power tool illustrated in FIG. 1.

FIG. 1 illustrates a hand-held power tool 1 according to some embodiments of the present disclosure. The hand-held power tool 1 is in some places herein referred to as "the power tool 1". The feature that the power tool 1 is hand-held means that the power tool 1 is configured to be supported by one or two hands of a user during operation thereof. The power tool 1 comprises a tool 2 and a motor assembly 3 configured to power the tool 2. According to the illustrated embodiments, the power tool 1 is a chainsaw, i.e. a power tool 1 comprising a tool 2 in the form of a cutting chain. Moreover, according to the illustrated embodiments, the motor assembly 3 comprises an internal combustion engine. The internal combustion engine may be a small sized two-stroke internal combustion engine, as is the case according to the illustrated embodiments. The internal combustion engine comprises a number of sub-systems such as a fuel supply system, an air supply system, an ignition system, a lubricant system, an exhaust system, and the like.

According to further embodiments, the motor assembly 3, as referred to herein, may comprise another type of power unit than an internal combustion engine, such as an electric motor. Furthermore, according to some embodiments, the power tool 1, as referred to herein may be another type of power tool 1 than a chainsaw, such as for example a multi-tool, a circular saw, a power cutter, a trimmer, a hedge trimmer, a lawn mower, a leaf blower, a snow blower, or the like.

The power tool 1 comprises a rear handle 6 and a front handle 6' each configured to be gripped by a hand of a user during operation of the power tool 1. Thus, according to the illustrated embodiments, the power tool 1 is configured to be supported by two hands of a user during operation thereof.

The power tool 1 further comprises an actuator 5. According to the illustrated embodiments, the actuator 5 is arranged at a region of the rear handle 6 of the power tool 1 and functions as a stop button for the power tool 1. Alternatively, the actuator 5 may be arranged at another position of the power tool 1. The power tool 1 further comprises a light emitting device 7. According to the illustrated embodiments, the light emitting device 7 is arranged on the actuator 5. According to further embodiments, the light emitting device 7 may be arranged adjacent to the actuator 5, such as immediately adjacent to the actuator. The feature that the light emitting device 7 is arranged adjacent to the actuator 5 may encompass that the light emitting device 7 is arranged at a distance less than 3 cm from the actuator 5.

Figure 2:
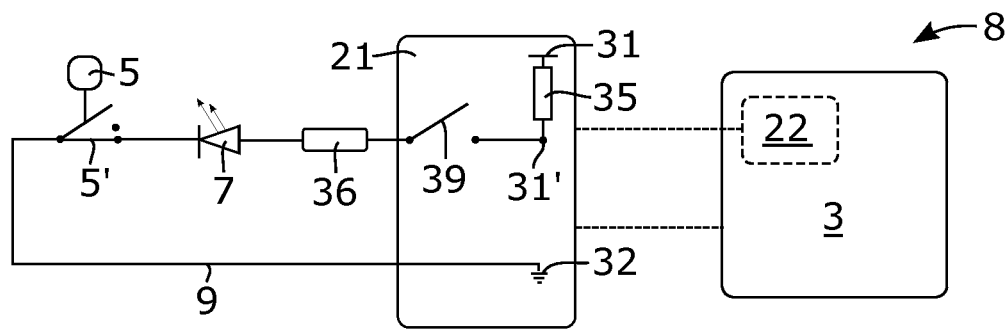

FIG. 2 schematically illustrates a power/control assembly 8 of the power tool 1 illustrated in FIG. 1. Below, simultaneous reference is made to FIG. 1 and FIG. 2, if not indicated otherwise. The power/control assembly 8 comprises the motor assembly 3, the light emitting device 7, and the actuator 5 of the power tool 1. According to the illustrated embodiments, the light emitting device 7 is a light emitting diode but may alternatively be another type of light emitting device, such as a bulb, or the like. Moreover, the power assembly 8 of the power tool 1 comprises a control arrangement 21. The control arrangement 21 is operably connected to the actuator 5, to the motor assembly 3, and to the light emitting device 7. According to the illustrated embodiments, the control arrangement 21 is operably connected to the actuator 5, to the motor assembly 3 and to the light emitting device 7 via an electric circuit 9, as is further explained herein.

The control arrangement 21 is configured to switch between a first and a second state based on input from the actuator 5. Moreover, the control arrangement 21 is configured to enable operation of the motor assembly 3 when in the first state and is configured disable operation of the motor assembly 3 when in the second state. According to the illustrated embodiments, the control arrangement 21 is operably connected to a control unit 22 of the motor assembly 3 and is configured to enable or disable operation of the motor assembly 3 by outputting a signal to the control unit 22 of the motor assembly 3. According to further embodiments, the control arrangement 21 may be configured to enable or disable operation of the motor assembly 3 in another manner. Purely as examples, the control arrangement 21 may be configured to disable operation of the motor assembly 3 by rendering a fuel and/or ignition system of the motor assembly 3 inoperable. As a further example, in embodiments in which the motor assembly 3 comprises an electric motor, the control arrangement 21 may disable operation of the motor assembly 3 by rendering the electric motor inoperable.

Moreover, according to embodiments described herein, the control arrangement 21 is configured to obtain fault data indicative of an at least potential operational fault of the power tool 1. According to the illustrated embodiments, the control arrangement 21 is configured to obtain the fault data from the control unit 22 of the motor assembly 3. As an alternative, or in addition, the control arrangement 21 may be configured to obtain the fault data from one or more other control units, sensors, and/or types of devices of the power tool 1. Purely as examples, the fault data may be indicative of one or more at least potential operational faults such as broken or worn component, short circuiting, broken wire, at least partially depleted energy storage unit such as a fuel tank or a battery, at least partially depleted lubricant tank, clogged, stuck, and/or damaged tool 2, clogged, stuck, and/or damaged transmission between a power unit of the motor assembly 3 and the tool 2, excess speed of a power unit of the motor assembly 3, clogged air filter, clogged fuel filter, and the like. As an alternative, or in addition, the fault data may be indicative of one or more potential operational fault such as indicative of the need for maintenance of the power tool 1. According to such embodiments, the fault data may for example be generated when the power tool 1 has been operated during a certain time period, or the like.

The control arrangement 21 is configured to cause the light emitting device 7 to output a first type of signal when no fault data is obtained. Moreover, the control arrangement 21 is configured to cause the light emitting device 7 to output a second type of signal, being distinguishable from the first type of signal, when fault data is obtained. In this manner, a power tool 1 is provided capable of indicating the presence of an at least potential operational fault of the power tool 1 to a user in a simple and efficient manner. Moreover, due to these features of the power/control assembly 8 of the power tool 1, a cost-efficient solution is provided because only one light emitting device 7 is needed for indicating the presence of an at least potential operational fault of the power tool 1 to the user of the power tool 1. In other words, a power tool 1 is provided having conditions and characteristics suitable for being manufactured and assembled in a cost-efficient manner while being capable of informing a user of the power tool about the presence of an at least potential operational fault of the power tool 1. As a further result thereof, damage of components of the power tool 1 caused by improper operation of the power tool 1, and/or operation of the power tool during presence of an at least potential operational fault of the power tool 1, can be avoided. Moreover, a user of the power tool 1 can be informed when it is time to perform service or maintenance of the power tool 1, and/or when it is time to replace one or more components of the power tool 1.

In addition, since the light emitting device 7 is arranged on or adjacent to the actuator 5, a power tool 1 is provided having conditions for being used in an intuitive manner because the first and second signals are emitted from a position of the power tool 1 at which the user interacts upon activation and/or deactivation of the power tool 1.

According to the embodiments illustrated in FIG. 1 and FIG. 2, the actuator 5 is formed as a button and is movably arranged between a first and a second position. Moreover, according to the embodiments illustrated in FIG. 2, the actuator 5 comprises a switch 5', such as a micro switch. As indicated above, the power tool 1 comprises an electric circuit 9 operably connecting the actuator 5 and the light emitting device 7 to the control arrangement 21. According to these embodiments, the control arrangement 21 is configured to receive input from the actuator 5 by monitoring the voltage in the electric circuit 9. In more detail, according to the embodiments illustrated in FIG. 2, the control arrangement 21 is configured to supply a voltage between the points 31 and 32 of the electric circuit 9 indicated in FIG. 2. The control arrangement 21 is further configured to monitor a voltage between the points 31' and 32 of the electric circuit 9 indicated in FIG. 2. Moreover, according to the illustrated embodiments, the switch 5' of the actuator 5 is configured to break the electric circuit 9 upon actuation. In FIG. 2, the actuator 5 is illustrated in a first position. According to the embodiments illustrated in FIG. 2, the switch 5' is configured to assume a closed state when the switch 5' is in the first position. In this manner, the control arrangement 21 can measure a certain voltage level and can identify that the actuator 5 is in the first position.

Figure 3:
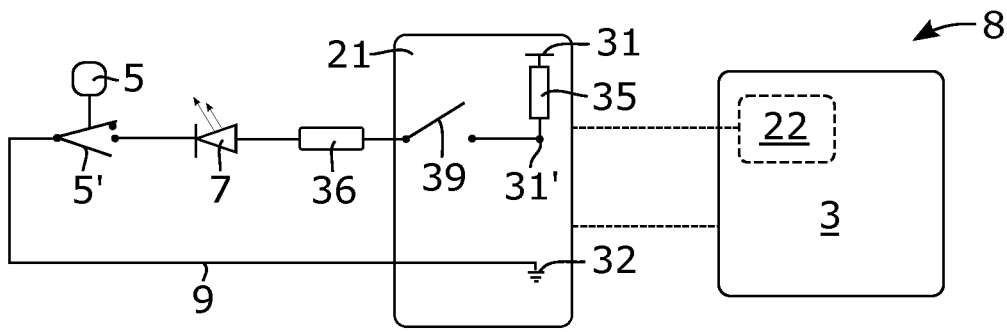
FIG. 3 illustrates the power/control assembly illustrated in FIG. 2, wherein an actuator is illustrated in a second position.

FIG. 3 illustrates the power/control assembly 8 illustrated in FIG. 2, wherein the actuator 5 is illustrated in the second position. According to these embodiments, the switch 5' is configured to break the electric circuit 9, i.e. configured to assume an open state, when the actuator 5 is transferred to the second position. As a result thereof, the control arrangement 21 can measure another certain voltage level, such as a zero voltage level, and can thereby identify that the actuator 5 is in the second position. The control arrangement 21 may comprise an analog-to-digital converter assembly, commonly abbreviated ADC, A/D, or A-to-D, configured to use the voltage between different points of the electric circuit 9, such as the points 31' and 32 indicated in FIG. 2 and FIG. 3, as an input for identifying a current position of the actuator 5. According to further embodiments of the herein described, the switch 5' may be configured to break the electric circuit 9, i.e. configured to assume an open state, when the actuator 5 is transferred from the second position to the first position. Thus, in such embodiments, the switch 5' is configured to assume a closed state when the actuator 5 is transferred from the first position to the second position.

According to embodiments herein, the control arrangement 21 is configured to assume the first state when the actuator 5 is in the first position and is configured to assume the second state when the actuator 5 is in the second position. Below, simultaneous reference is made to FIG. 1-FIG. 3, if not indicated otherwise. According to these embodiments, the electric circuit 9 comprises two ohmic resistors 35, 36 and a pulse generating component 39. The pulse generating component 39 may also be referred to as an electric pulse generating component. The pulse generating component 39 may comprise a transistor, a switch, a field-effect transistor (FET), a controllable relay, a thyristor, a controllable output CPU, or the like. According to the embodiments illustrated in FIG. 2 and FIG. 3, all components 35, 39, 36, 7, 5' are arranged in series in the electric circuit 9 between the points 31, 32 of the electric circuit 9. Moreover, according to the embodiments illustrated in FIG. 2 and FIG. 3, the pulse generating components 39 is arranged between the two ohmic resistors 35, 36. The ohmic resistor 36 may also be referred to as a diode ohmic resistor.

According to the illustrated embodiments, the control arrangement 21 utilizes the pulse generating component 39 for causing the light emitting device 7 to output the first type of signal or the second type of signal. According to some embodiments, the control arrangement 21 may control the pulse generating component 39 to generate pulses using Pulse Width Modulation (PWM), also referred to as Pulse Duration Modulation (PDM). According to the illustrated embodiments, one of the first and second types of signals involves a blinking light signal and the other of the first and second types of signals involves a continuous light signal. Thus, the control arrangement 21 may simply close the electric circuit 9 using the pulse generating component 39, and/or may control the pulse generating component 39 to generate a continuous ohmic resistance, and apply an electric current between the points 31, 32 to cause the light emitting device 7 to generate the continuous light signal. Moreover, the control arrangement 21 may open and close the electric circuit 9 using the pulse generating component 39, and/or may control the pulse generating component 39 to generate a varying ohmic resistance, and apply an electric current between the points 31, 32 to cause the light emitting device 7 to generate the blinking light signal.

According to some embodiments, the first type of signal comprises the continuous light signal and the second type of signal comprises the blinking light signal. In this manner, a user of the power tool 1 can recognize when there is an at least potential operational fault of the power tool 1 in a more intuitive manner. This is because a blinking light signal can be perceived as a fault indication in a more intuitive manner and can also more easily be perceived/noticed as compared to a continuous light signal. However, according to some embodiments of the present disclosure, the first type of signal may comprise a blinking light signal and the second type of signal may comprise a continuous light signal. Moreover, according to some embodiments, one or both of the first and second types of signals may comprise another type of signal and the first and second types of signals may be distinguishable from each other in another manner than by comprising continuous/blinking light signals. As an example, one of the first and second signals may involve a light signal having a higher intensity than the other of the first and second signals. As another example, one of the first and second signals may involve a deactivated light emitting device 7 which consequently emits no light. As a further example, the first and second types of signals may be distinguishable from each other by comprising blinking light signals having different frequencies, and/or different duration of the light signals.

Moreover, according to some embodiments, the control arrangement 21 may be configured to emit more than two different types of signals. As an example, the control arrangement 21 may be configured to emit two second types of signals, being distinguishable from each other and indicating different types of fault data. In this manner, a user of the power tool 1 can be informed about different types of fault data and may perform different measures in response thereto.

According to the embodiments illustrated in FIG. 2 and FIG. 3, the control arrangement 21 is configured to cause the light emitting device 7 to output the first type of signal or the second type of signal when the control arrangement 21 is in the first state. Moreover, according to the embodiments illustrated in FIG. 2 and FIG. 3, the control arrangement 21 is configured to render the light emitting device 7 inoperable when the control arrangement 21 is in the second state.

Figure 4:
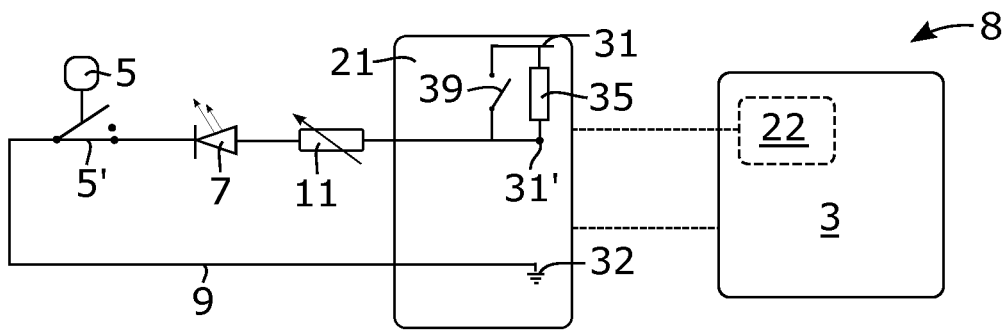
FIG. 4 illustrates a power/control assembly according to some further embodiments.

FIG. 4 illustrates a power/control assembly 8 according to some further embodiments. The power tool 1 illustrated in FIG. 1 may comprise a power/control assembly 8 according to the embodiments illustrated in FIG. 4. The power/control assembly 8 illustrated in FIG. 4 comprises the same features, functions, and advantages as the power/control assembly 8 explained with reference to FIG. 2 and FIG. 3, with some differences explained below.

According to the embodiments illustrated in FIG. 4, the power/control assembly 8 comprises a temperature sensor 11 arranged in the electric circuit 9. The temperature sensor 11 comprises a component having an ohmic resistance changing on the basis of the temperature of the component. Below, simultaneous reference is made to FIG. 1 and FIG. 4, if not indicated otherwise. According to the illustrated embodiments, the temperature sensor 11 is arranged inside the actuator 5 of the power tool 1. Therefore, according to the illustrated embodiments, the temperature sensed by the temperature sensor 11 is representative of a current ambient temperature.

According to the embodiments illustrated in FIG. 4, the temperature sensor 11 is arranged in series with the other components of the electric circuit 9, including the switch 5' of the actuator 5. The switch 5' operates in the same manner as explained with reference to FIG. 2 and FIG. 3 and can thus break the electric circuit 9 upon actuation of the actuator 5. According to the illustrated embodiments, the switch 5' is configured to assume a closed state when the actuator 5 is in the first position as is illustrated in FIG. 4. Thereby, when the actuator 5 is in the first position, the control arrangement 21 can measure the resistance caused by the electric circuit 9, and thus also caused by the temperature sensor 11, so as to measure a temperature representative of a current ambient temperature. The current ambient temperature may be utilized to control operation of the motor assembly 3 of the power tool 1 and/or other parts or arrangements of the power tool 1. Since the temperature sensor 11 is comprised in the electric circuit 9, a simple and cost-efficient solution is provided because only one electric circuit 9 is needed for achieving the herein described features and functions of the power tool 1. Moreover, the need for electric cables is kept low.

Another difference between the power/control assembly 8 illustrated in FIG. 4 and the power/control assembly 8 illustrated in FIG. 2 and FIG. 3 is that the electric circuit 9 of the power/control assembly 8 according to the embodiments illustrated in FIG. 4 comprises an ohmic resistor 35 arranged in parallel to the pulse generating component 39. In this manner, the electric circuit 9 can be closed also in cases where the pulse generating component 39 is open. However, the electric circuit 9 of the power/control assembly 8 illustrated in FIG. 4 may alternatively comprise an ohmic resistor 35 arranged in series with the pulse generating component 39 as the electric circuit 9 of the power/control assembly 8 illustrated in FIG. 2 and FIG. 3.

Figure 5:
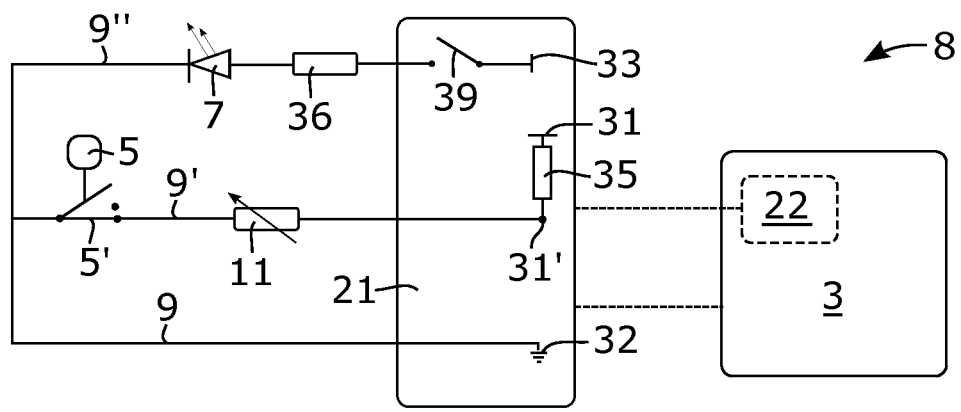
FIG. 5 illustrates a power/control assembly according to some further embodiments.

FIG. 5 illustrates a power/control assembly 8 according to some further embodiments. The power tool 1 illustrated in FIG. 1 may comprise a power/control assembly 8 according to the embodiments illustrated in FIG. 5. The power/control assembly 8 illustrated in FIG. 5 comprises the same features, functions, and advantages as the power/control assembly 8 explained with reference to FIG. 2-FIG. 4, with some differences explained below.

According to the embodiments illustrated in FIG. 5, the electric circuit 9 of the power/control assembly 8 comprises a first branch 9' and a second branch 9''', wherein the second branch 9''' is arranged in parallel to the first branch 9'. The power/control assembly 8 further comprises a second voltage supply 33 connected to the second branch 9'''. The light emitting device 7, an ohmic resistor 36, and the pulse generating component 39 are arranged in the second branch 9'''. The ohmic resistor 36 may also be referred to as a diode ohmic resistor. Moreover, the switch 5' of the actuator 5 is arranged in the first branch 9'. Thus, according to these embodiments, the actuator 5 is configured to break the first branch 9' upon actuation. In this manner, the control arrangement 21 is able to cause the light emitting device 7 to output a first or second signal regardless of the current position of the actuator 5 and thus also regardless of the current activation state of the power tool 1, i.e. also regardless of whether the control arrangement 21 is in the first or second state.

Moreover, as seen in FIG. 5, the power/control assembly 8 comprises a temperature sensor 11 arranged in the first branch 9' of the electric circuit 9. In this manner, the control arrangement 21 can sense a temperature representative of a current ambient temperature in the same manner as explained with reference to FIG. 4. Moreover, the current ambient temperature can be used in the same manner as explained with reference to FIG. 4.

In the embodiments of the power/control assembly 8 explained with reference to FIG. 2-FIG. 5, all of the above explained components of the power/control assembly 8, except the motor assembly 3 and the control unit 22 of the motor assembly 3, may be arranged in the actuator 5. Moreover, according to some embodiments, all of the above explained components of the power/control assembly 8, except the motor assembly 3, the control unit 22 of the motor assembly 3, and the control arrangement 21 are arranged in the actuator 5. Thereby, a cost-efficient solution and a space-efficient solution can be provided for obtaining the herein described features, functions, and advantages. Thus, as understood from the above, the control arrangement 21, as described herein, may comprise one or more components arranged outside of the actuator 5.

Figure 6:
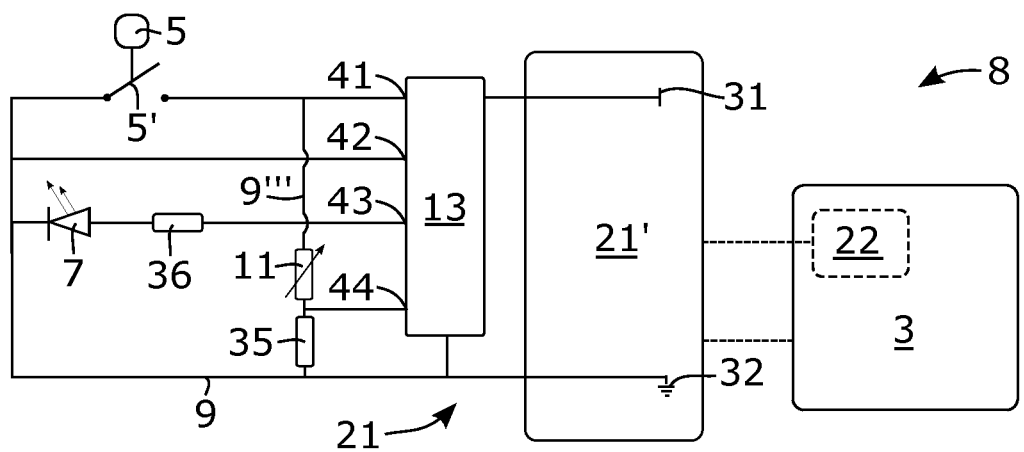
FIG. 6 illustrates a power/control assembly according to some further embodiments.

FIG. 6 illustrates a power/control assembly 8 according to some further embodiments. The power tool 1 illustrated in FIG. 1 may comprise a power/control assembly 8 according to the embodiments illustrated in FIG. 6. The power/control assembly 8 illustrated in FIG. 6 comprises the same features, functions, and advantages as the power/control assembly 8 explained with reference to FIG. 2-FIG. 5, with some differences explained below.

According to the embodiments illustrated in FIG. 6, the control arrangement 21 comprises a microprocessor 13. A microprocessor 13 is also commonly referred to as a processor or CPU. According to embodiments herein, the microprocessor 13 is arranged in the actuator 5. In this manner, more advanced control functions can be implemented in a space- and cost-efficient manner while the need for additional cables can be kept low.

As seen in FIG. 5, also in these embodiments, the power/control assembly 8 comprises a temperature sensor 11 arranged in the electric circuit 9. In this manner, the control arrangement 21 can sense a temperature representative of a current ambient temperature, which can be used in the same manner as explained with reference to FIG. 4.

The microprocessor 13 comprises a number of connections 41, 42, 43, 44 connected to components of the power/control assembly 8 via the electric circuit 9. Apart from the already mentioned components, the power/control assembly 8 according to the embodiments illustrated in FIG. 6 comprises an actuator 5, a switch 5', a light emitting device 7, and two ohmic resistors 35, 36 arranged in the electric circuit 9. The ohmic resistor 36 is arranged in series with the light emitting device 7 and may also be referred to as a diode ohmic resistor.

The switch 5' is connected to one connection 41 of the microprocessor 13 and the light emitting device 7 is connected to another connection 43 of the microprocessor. In this manner, the control arrangement 21 has conditions for causing the light emitting device 7 to output the first or second signals regardless of a current state or position of the actuator 5. Moreover, a more advanced control, and/or more advanced signal types, of the light emitting device can be provided. In addition, according to the embodiments illustrated in FIG. 6, the temperature sensor 11 is arranged in a branch 9''' of the electric circuit 9 which is separated from the switch 5' and the light emitting device 7 and is connected to a separate connection 44 of the microprocessor 13. In this manner, the control arrangement 21 can sense a temperature representative of a current ambient temperature regardless of the operational state of the switch 5' and of the light emitting device 7.

According to the embodiments illustrated in FIG. 6, the control arrangement 21 may comprise a microprocessor 13 arranged in the actuator 5 and a control unit 21' arranged outside of the actuator. According to these embodiments, the control unit 21' may send instructions to the microprocessor 13, and/or may receive information therefrom. As an example, the control arrangement 21 may cause or utilize variations in a supply voltage, such as a supply voltage between the points 31 and 32 of the electric circuit 9 indicated in FIG. 6, to exchange information between the control unit 21' and the microprocessor 13. In this manner, the control unit 21' can send instructions to the microprocessor 13, and/or may receive information therefrom, via voltage supply cables. In this manner, the need for additional cables is kept low.

The control arrangement 21, as referred to herein, may comprise a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression "calculation unit" may represent a processing circuitry comprising a plurality of processing circuits, such as, e.g., any, some or all of the ones mentioned above.

The control arrangement 21 may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control arrangement 21 is connected to components of the power tool 1 for receiving and/or sending input and output signals. These input and output signals may comprise waveforms, pulses, or other attributes which the input signal receiving devices can detect as information and which can be converted to signals processable by the control arrangement 21. These signals may then be supplied to the calculation unit. One or more output signal sending devices may be arranged to convert calculation results from the calculation unit to output signals for conveying to other parts of the control system of the power tool 1 and/or the component or components for which the signals are intended. Each of the connections to the respective components of the power tool 1 for receiving and sending input and output signals may take the form of one or more from among a cable, an electronic communication bus, or a wireless connection.

In the embodiments illustrated, the power tool 1 comprises a control arrangement 21 but might alternatively be implemented wholly or partly in two or more control arrangements or two or more control units.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims. E.g. the light emitting device may also be a multicolour light emitting diode (also known as RGB diode) and the first and second types of signals may be emitted with different colours. As an example, the first type of signal may be a continuous, steady green light and the second type of signal may be a blinking red light.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A hand-held power tool comprising a tool and a motor assembly configured to power the tool, wherein the power tool further comprises:
    an actuator positioned on a lateral surface of a body of the hand-held power tool,
    a light emitting device arranged on or adjacent to the actuator, and
    a control arrangement operably connected to the actuator, to the motor assembly and to the light emitting device, the control arrangement being configured to switch between a first and a second state based on input from the actuator, wherein the control arrangement is configured to enable operation of the motor assembly when in the first state and is configured disable operation of the motor assembly when in the second state,
    wherein the control arrangement is configured to obtain fault data indicative of an at least potential operational fault of the power tool and is configured to cause the light emitting device to output a first type of signal when no fault data is obtained, and to cause the light emitting device to output a second type of signal, being distinguishable from the first type of signal, when fault data is obtained,
    wherein the motor assembly comprises an internal combustion engine,
    wherein the power tool comprises a temperature sensor configured to measure an ambient temperature,
    wherein the control arrangement is configured to receive the ambient temperature from the temperature sensor and control an operation of the internal combustion engine based on the ambient temperature,
    wherein the power tool comprises an electric circuit operably connecting the actuator and the light emitting device to the control arrangement,
    wherein the electric circuit comprises a first branch and a second branch arranged in parallel to the first branch,
    wherein the light emitting device is arranged in the second branch, and
    wherein the actuator and the temperature sensor are arranged in the first branch of the electric circuit.

2. The power tool according to claim 1, wherein the control arrangement is configured to cause the light emitting device to output the first type of signal or the second type of signal when the control arrangement is in the first state.

3. The power tool according to claim 1, wherein the control arrangement is configured to render the light emitting device inoperable when the control arrangement is in the second state.

4. The power tool according to claim 1, wherein one of the first and second types of signals involves a blinking light signal and the other of the first and second types of signals involves a continuous light signal.

5. The power tool according to claim 1, wherein the actuator is movable between a first and a second position, and wherein the control arrangement is configured to assume the first state when the actuator is in the first position and is configured to assume the second state when the actuator is in the second position.

6. The power tool according to claim 1, wherein the control arrangement is configured to receive input from the actuator by monitoring the voltage in the electric circuit.

7. The power tool according to claim 6, wherein the actuator is configured to break the electric circuit upon actuation.

8. The power tool according to claim 6, wherein the actuator is configured to break the first branch upon actuation.

9. The power tool according to claim 1, wherein the actuator comprises a switch.

10. The power tool according to claim 1, wherein the control arrangement comprises a microprocessor.

11. The power tool according to claim 10, wherein the microprocessor is arranged in the actuator.

12. The power tool according claim 1, wherein the light emitting device is a light emitting diode.

13. The power tool according to claim 1, wherein the power tool is a chainsaw.

14. A hand-held power tool comprising a tool and a motor assembly configured to power the tool, wherein the power tool further comprises:
    an actuator positioned on a lateral surface of a body of the hand-held power tool,
    a light emitting device arranged on or adjacent to the actuator, and
    a control arrangement operably connected to the actuator, to the motor assembly and to the light emitting device, the control arrangement being configured to switch between a first and a second state based on input from the actuator, wherein the control arrangement is configured to enable operation of the motor assembly when in the first state and is configured disable operation of the motor assembly when in the second state,
    wherein the control arrangement is configured to obtain fault data indicative of an at least potential operational fault of the power tool and is configured to cause the light emitting device to output a first type of signal when no fault data is obtained, and to cause the light emitting device to output a second type of signal, being distinguishable from the first type of signal, when fault data is obtained,
    wherein the motor assembly comprises an internal combustion engine,
    wherein the power tool comprises a temperature sensor configured to measure an ambient temperature, and
    wherein the control arrangement is configured to receive the ambient temperature from the temperature sensor and control an operation of the internal combustion engine based on the ambient temperature,
    wherein the power tool comprises an electric circuit operably connecting the actuator and the light emitting device to the control arrangement, wherein the electric circuit comprises a first branch and a second branch arranged in parallel to the first branch, wherein the light emitting device is arranged in the second branch, and wherein the actuator and the temperature sensor are arranged in a series connection in the first branch of the electric circuit.

\* \* \* \* \*